United States Patent [19]

Mancusi et al.

[11] Patent Number: 5,186,832

[45] Date of Patent: Feb. 16, 1993

[54] SPIRAL-WOUND HOLLOW FIBER MEMBRANE FABRIC CARTRIDGES AND MODULES HAVING INTEGRAL TURBULENCE PROMOTERS

[75] Inventors: Anthony W. Mancusi, Charlotte, N.C.; J. Clift Delozier, Ft. Mill, S.C.; Ravi Prasad; Charles J. Runkle, both of Charlotte, N.C.; Harry F. Shuey, San Dimas, Calif.

[73] Assignee: Hoechst Celanese Corporation, Charlotte, N.C.

[21] Appl. No.: 917,690

[22] Filed: Jul. 20, 1992

Related U.S. Application Data

[63] Continuation of Ser. No. 815,450, Dec. 31, 1991, abandoned.

[51] Int. Cl.⁵ .................................... B01D 63/10
[52] U.S. Cl. .......................... 210/321.8; 210/321.89
[58] Field of Search ............ 210/497.01, 497.1, 500.21, 210/321.6, 321.72, 321.78, 321.79, 321.8, 321.74, 321.87, 321.88, 321.89

[56] References Cited

U.S. PATENT DOCUMENTS

| | | |
|---|---|---|
| 3,228,877 | 1/1966 | Mahon . |
| 3,422,008 | 1/1969 | McLain . |
| 3,557,962 | 1/1971 | Kohl . |
| 3,690,465 | 9/1972 | McGinnis et al. . |
| 3,801,401 | 4/1974 | Cope et al. . |
| 3,957,648 | 5/1976 | Roget et al. . |
| 4,080,296 | 3/1978 | Clark . |
| 4,140,637 | 2/1979 | Walter . |
| 4,220,535 | 9/1980 | Leonard . |
| 4,293,418 | 10/1981 | Fujii et al. . |
| 4,430,219 | 2/1984 | Kuzumoto et al. . |
| 4,460,641 | 7/1984 | Barer et al. . |
| 4,610,789 | 9/1986 | Barch . |
| 4,666,469 | 5/1987 | Krueger et al. . |
| 4,689,255 | 8/1987 | Smoot et al. . |
| 4,707,268 | 11/1987 | Shah et al. . |
| 4,758,341 | 7/1988 | Banner . |
| 4,781,834 | 11/1988 | Sekino et al. . |
| 4,840,227 | 6/1989 | Schmidt . |
| 4,855,058 | 8/1989 | Holland et al. . |
| 4,911,846 | 3/1990 | Akasu et al. . |
| 4,940,617 | 7/1990 | Baurmeister . |
| 4,961,760 | 10/1990 | Caskey et al. . |
| 5,026,479 | 6/1991 | Bikson et al. . |
| 5,096,584 | 3/1992 | Reddy et al. ............ 210/321.74 |

FOREIGN PATENT DOCUMENTS

| | | |
|---|---|---|
| 0093677 | 11/1983 | European Pat. Off. . |
| 233946 | 3/1986 | Fed. Rep. of Germany . |
| WO83/00098 | 1/1983 | PCT Int'l Appl. . |

*Primary Examiner*—Frank Sever
*Attorney, Agent, or Firm*—Kenneth A. Genoni; Jay M. Brown

[57] ABSTRACT

This invention provides spiral-wound hollow fiber membrane fabric-containing cartridges and modules for separations and other phase contact applications, in which the cartridges contain a turbulence-promoting fibrous web which is substantially-co-extensive to the fabric-like array, that induces turbulent fluid flow in the shell side of the hollow fiber membrane bundle; and methods for fabricating such cartridges.

13 Claims, No Drawings

SPIRAL-WOUND HOLLOW FIBER MEMBRANE FABRIC CARTRIDGES AND MODULES HAVING INTEGRAL TURBULENCE PROMOTERS

This is a continuation of copending application Ser. No. 07/815,450 filed on Dec. 31, 1991, now abandoned.

BACKGROUND

This invention relates to the field of spiral-type hollow fiber membrane fabric-containing cartridges and modules for separations and other phase contact applications. In particular, this invention relates to improved cartridges and modules containing integral turbulence promoters. The teachings of this invention can, if desired, be used in conjunction with the subject matter of applicant's copending U.S. patent application entitled, "Spiral-Wound Hollow Fiber Membrane Fabric Cartridges and Modules Having Flow-Directing Baffles", filed concurrently herewith, which is hereby incorporated by reference.

There is a great deal of prior art relating to the structure, fabrication and use of spiral-type hollow fiber-containing cartridges. Among the early disclosures of such devices are Mahon U.S. Pat. No. 3,228,877 and McLain U.S. Pat. No. 3,422,008, both of which are incorporated herein by reference. In general, a bundle of hollow fibers is positioned around and parallel to the longitudinal axis of a rod-shaped core (which may be a hollow mandrel and may or may not be removed after the bundle is fabricated), the ends of the hollow fiber bundle are potted in tube sheets to form a cartridge, and the cartridge is fitted into a pressure housing suitably ported to facilitate feed, permeate and concentrate fluid flows, constituting a complete module.

More recently, the art has improved such cartridges and modules by forming the hollow fibers into a fabric-like web in which the hollow fibers, substantially parallel to the core axis, are held in place relative to each other by transverse filaments which may or may not also be hollow fibers.

Despite these developments, the challenge to optimize the operability, efficiency and durability of these hollow fiber-and hollow fiber-fabric-containing cartridges and modules has continued. The flow of fluids (both liquid and gaseous) through the bundle can present further problems for the operator, including channeling, growth of boundary layers and other inefficiencies in fluid/membrane contact (which may prevent effective mass transfer). Hence, some relatively recent developments in the art suggest the interposition of a turbulence-promoting web among loose hollow fibers or between layers of a hollow fiber fabric.

The Baurmeister U.S. Pat. No. 4,940,617 relates to a hollow fiber fabric-containing module having at least two plies of hollow fibers held in place by transverse fibers, disposed so that the hollow fibers of adjacent plies cross each other consistent with a prescribed formula including a numerical range for the crossing angles. Baurmeister discloses that to even out the flow of a fluid around the hollow fibers of the hollow fiber wound body, a fluid-permeable, more or less stiff or elastic fabric can be disposed between at least one portion of the hollow fiber plies of the hollow fiber wound body. The patent also refers to the channeling problem, and the desirability of radial flow (transverse to the hollow fibers). Further, Baurmeister makes passing reference to a hollow fiber mat with transverse fibers or tapes on only one side. Nowhere, however, does Baurmeister disclose or suggest the integration of a single-layer hollow fiber fabric and a co-extensive turbulence-promoting web on one side of the hollow fiber fabric, into an intermittently-bonded unitary material.

The McGinnis U.S. Pat. No. 3,690,465 relates to the broad concept of interposing a foraminous material between hollow fibers in a separatory unit. The stated purpose is to prevent hollow fiber movement and nesting. In one embodiment, the hollow fibers are placed on the foraminous material, the latter preferably being a web. The hollow fibers are preferably laid down more than one hollow fiber thick. In another embodiment, a hollow fiber is wound transversely and continuously around both sides of an advancing foraminous web, and the web and associated fiber is then assembled into a unit. In both types of such assemblies, each layer of hollow fibers will be adjacent to at least one additional layer of hollow fibers. As a result, there will be a significant amount of hollow fiber/hollow fiber direct contact, and a corresponding decrease in hollow fiber—shell side fluid contact. Moreover, there is no disclosure or suggestion in McGinnis to employ an integral hollow fiber array: loose hollow fibers or a continuous hollow fiber, are contemplated. There is no suggestion to intermittently bond the hollow fibers to the foraminous material across the full length of the fibers. Finally, there is no reference to the need for turbulence promotion. See also, Cope U.S. Pat. No. 3,801,401, which contains similar teachings.

The Smoot U.S. Pat. No. 4,689,255 relates to separatory units made from glass hollow fibers. The hollow fibers are collected in strands and the strands into rovings. The rovings are lined up parallel to each other in multiple layers on a permeable sheet, and another permeable sheet is laid on top (to dissipate fluid flow forces entering the mat when it is wrapped around a fluid distributor in a cartridge). The hollow fibers are bonded to the permeable sheet by strips or ribbons of adhesive. In this device, there is no disclosure or suggestion of using a hollow fiber fabric—instead, rovings are employed. The rovings are bonded only at their ends by strips/ribbons of adhesive.

Published P.C.T. application WO83/00098 discloses a process for making an assembly of hollow fibers on one side of a foraminous support, which can then be wound into a spiral cartridge. The hollow fibers are sealed onto the support only at the ends. The hollow fibers are not in an integral array: they are laid down individually and sealed to the ends.

The Barer U.S. Pat. No. 4,460,641 relates to chemical-protective clothing comprising a hollow fiber fabric formed e.g., by weaving or knitting, and notes that composite fabrics can be used. A composite can be made by adhering hollow fiber fabric conventionally to various backing materials such as natural/synthetic cloths, fabrics, and permeable polymer films. This patent makes no reference to cartridges and modules for carrying out separations and other phase contact operations, nor to the problems attendant their conventional designs.

The Sekino U.S. Pat. No. 4,781,834 relates to a hollow fiber-containing device intended to overcome bundle flow stagnation and channeling. According to Sekino, the solution is to provide holes in the central core placed (only) at one end of the bundle, and an opening in a perimeter wrap (allowing retentate exit) placed at the other end: forcing radial flow. Optionally, gauze-like cloths can be put in the bundle near both ends, to improve radial distribution. These cloths are not continuous throughout the bundle length, and are not between each hollow fiber layer.

The Clark U.S. Pat. No. 4,080,296 relates to a hollow fiber permeator having a radial tubesheet at an intermediate position on the core. Clark notes in passing, that the fiber bundle may include means, such as fabric wraps, for constraining the bundle and/or improving the uniformity of feed fluid distribution between the fibers that form it. There is no explanation in the patent of where such wraps would be placed or how they would be constructed.

The Shah U.S. Pat. No. 4,707,268, relates to a microfilter comprising a hollow fiber bundle potted at both ends; the hollow fibers can be separated by radial ribs parallel to the core axis. Shah notes in passing that the hollow fibers can be contained in a screen matrix or fabric which is then wound around the core. It is unclear from this disclosure whether the hollow fibers themselves constitute the "fabric" or are somehow (unexplained) contained in a fabric.

The Krueger U.S. Pat. No. 4,666,469 discloses a hollow fiber membrane device having an inner wrap: a thin material located at 25% or less of the device radius away from the core. The wrap material surrounds and constrains inner fibers assembled about feed flow distribution means; the lumens of the constrained fibers are preferably sealed. The wrap may be discontinuous; it extends cartridge life. There is no disclosure of a hollow fiber fabric in this patent.

Despite these many efforts in hollow fiber cartridge design, the need for improvement continues.

It is therefore an object of this invention to provide improved spiral-type hollow fiber membrane fabric-containing cartridges containing a hollow fiber fabric-like array integrally-bonded to a turbulence-promoting, co-extensive web, for separations and other phase contact applications.

It is another object of this invention to provide such cartridges incorporated in modules for carrying out separations and other phase contact applications.

Further objects will be set forth in the discussion below.

SUMMARY OF THE INVENTION

According to the invention, improvements are provided in a spiral-type hollow fiber membrane fabric-containing modular module, said module comprising:
  a. a plurality of hollow fiber membranes each having a lumen, said membranes being formed into an array in which the hollow fibers substantially are mutually-parallel;
  b. the array being wound upon an axis which is substantially parallel to the hollow fibers into a spirally-wound membrane bundle having two bundle ends and an exterior surface;
  c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;
  d. a housing having first and second housing ends and a housing interior and being suitably shaped to contain the membrane bundle, having means adjacent the first housing end sealing the tube sheet adjacent the first bundle end to the housing interior, said housing which contains the bundle defining two regions mutually communicating through the membrane including (1) a shell-side space exterior to the portion of the bundle between the tube sheets and within the housing, and (2) a space including the hollow fiber lumens and the first bundle end;
  e. first end cap means adjacent the first housing end and suitably shaped, together with the housing interior and the first bundle end, to seal the first housing end and define a first chamber communicating with the membrane lumens;
  f. second end cap means adjacent the second housing end and suitably shaped, together with the housing interior and the second bundle end, to seal the second housing end and define a second chamber;
  g. the housing having at least one port communicating with the shell-side space, arranged to permit fluid injection and withdrawal therethrough; and
  h. the housing having at least one port communicating with the first chamber, arranged to permit fluid injection and withdrawal therethrough;
the improvement comprising:
  i. a turbulence promoting web;
in which the hollow fibers in the array are arranged in a single mutually parallel layer facing one side of and at least intermittently bonded across their full lengths to the web, the web being coextensive with the entire layer of hollow fibers.

In further embodiments, the module additionally comprises a hollow mandrel having a longitudinal axis and an exterior surface, an axial bore, and perforations along the surface which communicate with the bore.

In other embodiments, both of the lumen ends of each of the hollow fibers are exposed and communicate with the exterior of the bundle.

The invention also provides spiral-type hollow fiber membrane fabric-containing cartridges, said cartridges comprising:
  a. a plurality of hollow fiber membranes each having a lumen, said membranes being formed into an array in which the hollow fibers substantially are mutually-parallel;
  b. the array being wound upon an axis which is substantially parallel to the hollow fibers into a spirally-wound membrane bundle having two bundle ends and an exterior surface;
  c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting at least a first one of the bundle ends being exposed and communicating with the exterior of the bundle;
the improvement comprising:
  d. a turbulence promoting web;
in which the hollow fibers in the array are arranged in a single mutually parallel layer facing one side of and at least intermittently bonded across their full lengths to the web, the web being coextensive with the entire layer of hollow fibers.

Additional embodiments of such cartridges in which the cartridge additionally comprises a hollow mandrel, are provided.

The invention further provides methods of fabricating a spiral-type hollow fiber membrane fabric-containing cartridge, comprising the following steps:

a. forming a plurality of hollow fiber membranes each having a lumen, into an array in which the hollow fibers substantially are mutually-parallel; then
b. winding the array upon an axis which is substantially parallel to the hollow fibers into a spirally-wound membrane bundle having two bundle ends and an exterior surface; then
c. potting each of the two bundle ends in resinous potting material serving to seal the bundle end into an adjacent monolithic tube sheet, a portion of the bundle between the two tube sheets being free from potting material to form a shell-side region; then
d. exposing the lumen ends of the hollow fibers constituting at least a first one of the bundle ends to communicate with the exterior of the bundle;

the improvement comprising:

e. subsequent to step (a), providing a turbulence promoting web;
f. simultaneously with or subsequent to step (e), arranging the hollow fibers of the array in a single mutually parallel layer facing one side of and at least intermittently bonded across their full lengths to the web, the web being coextensive with the entire layer of hollow fibers.

Embodiments of the method in which the cartridge additionally comprises a hollow mandrel, also are provided.

Further embodiments will be described in detail below, and defined in the appended claims.

DESCRIPTION OF THE PREFERRED EMBODIMENTS

This invention is an improvement in the art of spiral-type hollow fiber membrane fabric-containing cartridges and modules for separations and other phase contact applications. The term "phase contact" is used herein to generally describe any process involving mass- and/or heat-transfer.

The hollow fibers suitable for use in the invention generally include all such materials which can be formed into spiral-type membrane-containing cartridges for separations and other phase contact applications. These hollow fibers may, for example, be microporous, foraminous, or allow diffusion transfer. Hollow fibers of relatively large diameter (sometimes referred to as "tubular membranes") can also be used provided that they have sufficient structural strength to maintain their shape in the bundle. Suitable hollow fibers, described by dimensions and other structural features, and including materials for making the hollow fibers and processes for such manufacture, are disclosed, for example, in the following U.S. patents which are hereby incorporated by reference: U.S. Pat. No. 4,293,418; Kuzumoto U.S. Pat. No. 4,430,219; Banner U.S. Pat. No. 4,758,341; Sekino U.S. Pat. No. 4,781,834; Akasu U.S. Pat. No. 4,911,846; Caskey U.S. Pat. No. 4,961,760; and Bikson U.S. Pat. No. 5,026,479.

The selected hollow fibers are then fabricated into a fabric-like array for assembly into the cartridge. Generally, the principal benefit of incorporating the hollow fibers into a fabric-like array rather than using loose fibers, is that the fabric structure holds adjacent hollow fibers in a spaced-apart, mutually parallel relationship. This configuration promotes regularity of the bundle and resultant uniformity in fluid flow dynamics. In preferred embodiments, the hollow fibers constitute the weft of a fabric, e.g., are placed transversely between warp filaments by the guide elements of a loom. Given that the hollow fibers constituting the fabric weft must be held in place by warp filaments, such warp can take any form as taught in the art for fabric-like hollow fiber arrays for spiral bundle production. For example, the warp filaments can themselves be solid or also be hollow fibers, and the fabric construction can be selected from the variety taught by the art. The fabric can, alternatively, be prepared by substituting warp for weft and weft for warp, so that the hollow fibers, constituting the warp, are held by weft filaments. Hence, the terms "warp" and "weft" are used interchangeably hereinafter, and merely designate two groups of filaments or fibers which are oriented transversely to one another to yield a fabric-like web. Suitable hollow fiber-containing fabric-like arrays, including their construction, structure and performance, are taught, for example, in the following U.S. patents which are hereby incorporated by reference: Kohl U.S. Pat. No. 3,557,962; Barer U.S. Pat. No. 4,460,641; Akasu U.S. Pat. No. 4,911,846; and Baurmeister U.S. Pat. No. 4,940,617; see also European Patent Application No. 0,093,677, published Nov. 9, 1983; and German Democratic Republic Patent Application No. 233,946, published Mar. 19, 1986.

According to the invention, the hollow fiber fabric-like array is integrally-bonded to a turbulence-promoting, co-extensive web to form an integrated material. Broadly, the required features of this integrated material are:

(a) a fabric-like array comprising a plurality of hollow fibers which are arranged in a single and mutually-parallel layer;
(b) a turbulence-promoting web which is coextensive with the entire layer of hollow fibers;
(c) the fabric-like array facing one side of and at least intermittently bonded to the web across the full lengths of the hollow fibers.

Generally, the fabric-like array itself is a conventional element, as described above. The key requirements for it as used in the practice of the invention are that (1) the hollow fibers should preferably be in a substantially-mutually-parallel array; (2) the hollow fibers should be held together by warp filaments (except as indicated below); and (3) the hollow fibers must be arranged in a single layer with insignificant overlaps at most. Practice of the invention does not, however, strictly require that the hollow fibers be mutually parallel: they should be substantially parallel, but arrays having non-parallel hollow fibers can be used - the operating results may be correspondingly reduced from the optimum. In preferred embodiments, the hollow fibers in the fabric-like array are held together by transversely-arranged interposed warp filaments; but equivalent means yielding a mono-layer hollow fiber array can be used, if available. It is, however, required according to the invention that the hollow fibers be arranged in a single layer in the array, with minor instances of hollow fiber overlap at most. The single layer feature promotes contact between the hollow fibers and the shell-side fluid.

The turbulence-promoting web serves two distinct purposes: (1) anchoring the fabric-like array in place; and (2) promoting turbulence in the shell-side fluid flowing through the web. So that turbulence promotion is maximized in the bundle, the web should be sized coextensively with the hollow fibers; this promotes maximum contact with the shell-side fluid. Most generally, the web should be a fluid permeable sheet material having an appropriate thickness and density (similar to the thickness and density of conventional materials used in spiral-type cartridges), and adequate permeability to allow shell-side fluid flow.

The fabric-like array must face one side of the web, and be at least intermittently bonded to it to form a two layer turbulence promoting composite material. These requirements ensure that each of the hollow fiber layers in the spiral-wound cartridge will be separated by a single layer of the web, thus maximizing hollow fiber/shell-side fluid contact. That the array and web are at least intermittently bonded across the full lengths of the hollow fibers, ensures that the hollow fibers will be held in position during cartridge use, and reduces the difficulties of handling hollow fibers during cartridge fabrication. Optionally, the array and web can be continuously bonded together; but bonded areas may block fluid flow and may thus raise the shell-side pressure drop. Further, such continuous bonding, if excessive, may reduce the available hollow fiber membrane surface area exposed to the shell side fluid for mass transfer. The benefits of this composite construction include improved spiral winding efficiency and convenience (the composite material need simply be wound onto a mandrel), improved cartridge and module quality (wrinkles and other discontinuities in the bundle are minimized), and better durability (the hollow fiber fabric-like array is immobilized by the turbulence promoting web).

In two embodiments, respectively, the turbulence-promoting web is a non-woven, fibrous material having unbonded fiber ends, and is bonded to (1) a hollow-fiber fabric, or (2), an array of unbonded hollow fibers, by knitting. In these embodiments, the requirements that the turbulence-promoting web is fibrous and has unbonded fiber ends ensure that bonding together of the web and the array yields a composite material without unacceptable channeling through needle holes in the web. The many randomly-oriented loose fiber ends will tightly close around holes left by the knitting needles. Preferably, the nonwoven web is non-calendared, to maximize the availability of unbonded fiber ends. Preferably, the pre-formed web is advanced through a loom and the hollow fibers are attached by knitting on top of the web. In such case, the loom should be adjusted (conventionally) so that the web is not damaged by the knitting needles, and the hollow fibers are placed adequately close together. Hollow fiber spacing should be balanced between maximizing bundle packing, and permitting adequate fluid flow between the hollow fibers.

In less-preferred but related embodiments, (a) the turbulence-promoting web is non-woven but does not necessarily have unbonded fiber ends, and the hollow fiber-fabric or -unbonded array is bonded to the web by means not involving needle penetration of the web, e.g., glue, heat, or ultrasonic welding. In further embodiments, a woven fibrous material is substituted for the nonwoven fibrous material, with the other parameters as above. In another embodiment, the turbulence-promoting web is woven simultaneously with the attachment of an array of unbonded hollow fibers.

In additional embodiments, an array of unbonded hollow fibers or a hollow fiber-containing fabric, is advanced under means for forming a spun-bonded fibrous web. The spun-bonded fibrous web can either be a pre-formed material (in which case the spun-bonded fibrous web is in effect substituted for the nonwoven, fibrous material referred to in the previous paragraph, or, the spun bonded web is formed directly on the surface of the advancing unbonded hollow fiber array or bonded hollow fiber-containing fabric.

In other less preferred alternatives, the web can be a perforated film, or a knitted, screen, scrim or netting material or the like.

According to preferred embodiments, a rod-shaped core is located at the longitudinal axis of the cartridge (if desired, this core can be temporarily placed at the axis, and removed following bundle fabrication). Although a solid rod can be used solely to provide structural support for the cartridge, hollow core mandrels are preferred. Core mandrels generally have a longitudinal axis and a cylindrical exterior surface, an axial bore, and perforations along the surface which communicate with the bore. Typical mandrels have cylindrical interior and exterior surfaces; however it is within the scope of the invention to employ mandrels having other surfaces, for example, mandrels having multi-sided geometric cross-sections (pentagonal, hexagonal, and the like), and mandrels whose bores contain internal axial flow dividers. Further, mandrels with non-axially-symmetrical cross-sections can also be used, e.g., mandrels with rectangular or oval cross-sections. The purpose of the perforations along the mandrel surface which communicate with the bore, is to facilitate fluid flow between the bundle and the mandrel bore along the mandrel's longitudinal axis. The mandrel perforations can take various shapes, such as round holes and elongated slits. The overall length of the mandrel can also be adjusted to suit particular needs. Suitable mandrels are disclosed in the following U.S. patents which are hereby incorporated by reference: Kuzumoto U.S. Pat. No. 4,430,219; and Caskey U.S. Pat. No. 4,961,760.

The process steps discussed immediately below are carried out by adapting conventional techniques, and as such will only be briefly mentioned. Further information on them can be found, for example, in the following U.S. patents which are hereby incorporated by reference: Caskey U.S. Pat. No. 4,961,760; and Bikson U.S. Pat. No. 5,026,479.

The fabric-like array and integrally-bonded turbulence-promoting web is then wound onto the core surface (or itself, if no core is used) to form a spirally-wound membrane bundle having two bundle ends communicating with the mandrel bore. Assuming that the selected hollow fiber fabric contains hollow fiber weft held together by solid warp filaments, then an end of the fabric is preferably aligned so that the hollow fibers are substantially parallel to the mandrel axis, the fabric and integral turbulence promoter end is attached to the mandrel (e.g. by clamping or adhesive), and the assembly is wound up into a cylinder. If, alternatively, a hollow fiber fabric having both weft and warp hollow fibers is used, then it may be desirable in certain applications to seal the warp fibers into communication with the mandrel perforations, and eliminate direct communication between the mandrel bore and the shell-side region. It is also well known in the art that hollow fiber-containing fabric-like arrays can be wound helically onto a core surface, so that the hollow fibers proceed along a helical path with respect to the axis, with their two ends located at opposite ends of the core. This invention can readily be practiced with such arrays; it is also not strictly required (although preferred), that the hollow fibers are mutually parallel.

Next, the two ends of the bundle are potted in resinous potting material serving to seal each of the bundle ends into a monolithic tube sheet and complete the cartridge. Both the materials and the basic methodology for carrying out potting to form tube sheets are well known in the art, as shown, for example, in the Caskey U.S. Pat. No. 4,961,760 which is hereby incorporated herein by reference. Any material known to those skilled in the art as useful for potting of hollow fiber bundles can be used. (Hereinafter, these materials will be referred to generally as "resinous potting materials"). When the potting process is completed, a substantial portion of the bundle (between the two tube sheets) will be free from resinous potting material, and one or both of the potted ends of the bundle are then trimmed so that the lumen ends of each hollow fiber at the trimmed end(s) will be exposed.

Finally, the potted bundle is fitted into a suitable housing to yield a module and facilitate operation. Generally, the housing should have two open ends and an interior, and be suitably shaped to contain the membrane bundle. After the bundle is installed in the housing, the tube sheet(s) adjacent to the bundle end(s) with exposed lumens is(are) sealed to the interior of the housing, to positively prevent fluid flow between the shell side and the lumen side without passage through the membrane. At this point, the module has been divided into two regions mutually communicating through the membrane including (1) a shell-side space which is exterior to the portion of the bundle between the tube sheets and is within the housing, and (2) a space including the hollow fiber lumens and the exposed bundle end(s). Next, end cap means suitably shaped to seal each of the two open housing ends are provided. These end caps, together with the housing interior and the bundle ends, serve to define two chambers, one or both of which communicate with the membrane lumens. To facilitate fluid introduction and recovery, suitable ports are provided for the housing. In embodiments where no mandrel is present, the housing must have at least one port communicating with the shell-side space, arranged to permit fluid injection and withdrawal therethrough. In embodiments including a mandrel, such ports are optional. In all embodiments of the invention, the housing must have at least one port communicating with the lumen side, arranged to permit fluid injection and withdrawal therethrough. Multiple ports can be provided, if desired. These considerations are further discussed in the prior art, including Caskey U.S. Pat. No. 4,961,760, which is hereby incorporated by reference.

There are several additional important considerations to be addressed in fabricating the cartridges and modules of the invention. First, cartridges can be either cast-in-place into a module or intended to be inserted in a pressure housing. Cast-in-place modules include a bundle and integrally-formed housing; they are self-contained and completely disposable. Such modules are relatively simple to fabricate; they are intended for low pressure applications and are often used where small modules are needed, e.g., for analytical-scale operations. Conventional cast-in-place modules containing hollow fiber bundles are commercially available and well-known. Cast-in-place modules according to the invention can be made by the steps of: (1) starting with (a) a bundle prepared as discussed above, and (b) a conventional cast-in-place housing, which is generally made of plastic; (2) inserting the bundle into the housing; (3) potting both of the bundle ends after sealing the bundle ends with a potting cup clamped over each end of the housing; and (4) providing suitable end caps and ports. For commercial-scale applications, high operating pressures are normally required; as a result, the cartridges must be contained by a high-pressure housing generally fabricated of metal, e.g., stainless steel. Such housings are expensive and are not disposable. Generally, the same fabrication steps are carried out as for cast-in-place modules.

Second, careful attention should be paid to the potting process. Conventionally, potting is facilitated either by gravity or centrifugal force. In either case, at least one port must be provided on the exterior of the housing communicating with the shell-side space, to allow introduction of the resinous potting material. In gravity potting, the resinous potting material is introduced into each bundle end, one at a time, and allowed to settle into the end of the bundle and cure. In centrifugal potting, the bundle is inserted into the housing, the assembly is spun on its midpoint to create centrifugal force at both bundle ends, resinous potting material is introduced into the shell-side space near both bundle ends, and the resin is allowed to cure. Centrifugal potting is generally not practical where pressure housings are used, because of the substantial weight of the housings.

When potting a relatively large cartridge, e.g. having a radial diameter of about four inches or greater, heat released by exothermic resinous potting material curing may damage the hollow fibers and render the cartridge inoperable. Further, if the viscosity of the resinous potting material is too high, the resin may not flow evenly through the bundle end. Further, both the centrifugal and gravity potting techniques necessitate at least one shell-side port on the side of the module's housing. If such ports are to be used in later module operation, multiple modules cannot be connected in series without exterior piping or specially-designed pressure housings. Hence, the centrifugal and gravity potting techniques may be unacceptable.

In such cases, according to preferred embodiments of the invention, potting is accomplished by forming the end seals for the bundle ends simultaneously with the winding of the array and web into a bundle, instead of employing a subsequent potting step. This potting operation is accomplished by putting down continuous resinous potting material lines at both bundle ends beginning at the unwound edge of the fabric facing and adjacent the nip with the axis, and proceeding along the fabric edge, forming continuous end seals at both bundle ends extending to the perimeter of the bundle. The width of the end seals generally should be great enough to withstand the full operating pressure of the cartridge. The bundle ends can be sealed to the housing interior as needed, by simply applying an appropriate amount of resinous potting material to the edge adjacent the bundle ends. Alternatively, a ring-shaped fitting designed to tightly rest against the end of the housing interior can be fabricated (e.g., injection molded), and adhesively attached to the edge adjacent the bundle end.

The spiral-type hollow fiber membrane fabric-containing cartridges and modules of the invention are generally operated in a manner similar to conventional cartridges and modules. Accordingly, suitable operating procedures are disclosed in the following U.S. patents which are hereby incorporated by reference: Banner U.S. Pat. No. 4,758,341; Holland U.S. Pat. No. 4,855,058; and Caskey U.S. Pat. No. 4,961,760. More particularly, a fluid can be introduced into the bundle lumens at either or both potted ends, and allowed to diffuse out of the fibers into the shell-side region. The permeated fluid can then be collected at either the mandrel (through the perforations) or at the cartridge perimeter, or both. Alternatively, a fluid can be introduced at one or both ends of the mandrel through the bore and allowed to diffuse through the mandrel perforations into the shell-side region. Fluid which permeates through the fibers into their lumens can then be collected at one or both of the potted bundle ends; and concentrate remaining in the shell-side region can be collected at the cartridge perimeter.

End use applications for the spiral-type hollow fiber membrane fabric-containing cartridges and modules of the invention include the end uses for conventional cartridges and modules as disclosed in the art. For example, the end uses disclosed in the following U.S. patents, which are hereby incorporated by reference, are contemplated: Holland U.S. Pat. No. 4,855,058; Baurmeister U.S. Pat. No. 4,940,617; and Caskey U.S. Pat. No. 4,961,760. In general, gaseous fluids will flow more evenly and freely through the bundle than liquids, whose resistance to free flow increases with viscosity. Accordingly, it is generally advisable to employ a cartridge or module having an increasingly effective turbulence-promoting web integrally-bonded to the fabric-like hollow fiber array to promote radial flow through the shell-side as the feed fluid viscosity increases.

While several embodiments of the invention have been illustrated and described above, it is not intended to be limited to the details shown, since various modifications and structural changes may be made without departing from the spirit of the present invention, which is defined by the claims below.

What is claimed as new and desired to be protected by Letters Patent is set forth in the appended claims.

We claim:

1. In a spiral-type hollow fiber membrane-containing module, said module comprising:
   a. a plurality of hollow fiber membranes each having a lumen, said membranes being formed into an array in which the hollow fibers substantially are mutually-parallel;
   b. the array being wound upon an axis which is substantially parallel to the hollow fibers into a spirally-wound membrane bundle having two bundle ends and an exterior surface;
   c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;
   d. a housing having first and second housing ends and a housing interior and being suitably shaped to contain the membrane bundle, having means adjacent the first housing end sealing the tube sheet adjacent the first bundle end to the housing interior, said housing which contains the bundle defining two regions mutually communicating through the membrane including (1) a shell-side space exterior to the portion of the bundle between the tube sheets and within the housing, and (2) a space including the hollow fiber lumens and the first bundle end;
   e. first end cap means adjacent the first housing end and suitably shaped, together with the housing interior and the first bundle end, to seal the first housing end and define a first chamber communicating with the membrane lumens;
   f. second end cap means adjacent the second housing end and suitably shaped, together with the housing interior and the second bundle end, to seal the second housing end and define a second chamber;
   g. the housing having at least one port communicating with the shell-side space, arranged to permit fluid injection and withdrawal therethrough; and
   h. the housing having at least one port communicating with the first chamber, arranged to permit fluid injection and withdrawal therethrough;

the improvement comprising:
   i. a turbulence promoting web;
in which the hollow fibers in the array are arranged in a single mutually parallel layer facing one side of and at least intermittently bonded across their full lengths to the web, the web being coextensive with the entire layer of hollow fibers.

2. In a spiral-type hollow fiber membrane-containing module, said module comprising:
   a. a plurality of hollow fiber membranes each having a lumen, said membranes being formed into an array in which the hollow fibers substantially are mutually-parallel;
   b. the array being wound upon an axis which is substantially parallel to the hollow fibers into a spirally-wound membrane bundle having two bundle ends and an exterior surface;
   c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers respectively constituting the first and second bundle ends being exposed and communicating with the exterior of the bundle;
   d. a housing having two housing ends and a housing interior and being suitably shaped to contain he membrane bundle, having means adjacent the two housing ends sealing both of the two tube sheets to the housing interior, said housing which contains the bundle defining two regions mutually communicating through the membrane including (1) a shell-side space exterior to the portion of the bundle between the tube sheets and within the housing, and (2) a space including the hollow fiber lumens and both of the bundle ends;
   e. two end cap means respectively adjacent the two housing ends and suitably shaped, together with the housing interior and the two adjacent respective bundle ends, to seal each of the two housing ends and define first and second chambers communicating with the membrane lumens;
   f. the housing having at least one port communicating with the shell-side space, arranged to permit fluid injection and withdrawal therethrough; and
   g. the housing having at least one port communicating with each of the two chambers, arranged to permit fluid injection and withdrawal therethrough;

the improvement comprising:
   h. a turbulence promoting web;

in which the hollow fibers in the array are arranged in a single mutually parallel layer facing one side of and at least intermittently bonded across their full lengths to the web, the web being coextensive with the entire layer of hollow fibers.

3. In a spiral-type hollow fiber membrane-containing module, said module comprising:
- a. a plurality of hollow fiber membranes each having a lumen, said membranes being formed into an array in which the hollow fibers substantially are mutually-parallel;
- b. a hollow mandrel having a longitudinal axis and an exterior surface, an axial bore, and perforations along the surface which communicate with the bore;
- c. the array being wound upon the axis such that the hollow fibers are substantially parallel to the axis, into a spirally-wound membrane bundle having two bundle ends and an exterior surface;
- d. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;
- e. a housing having first and second housing ends and a housing interior and being suitably shaped to contain the membrane bundle, having means adjacent the first housing end sealing the tube sheet adjacent the first bundle end to the housing interior, said housing which contains the bundle defining two regions mutually communicating through the membrane including (1) a shell-side space exterior to the portion of the bundle between the tube sheets and within the housing, and (2) a space including the hollow fiber lumens and the first bundle end;
- f. first end cap means adjacent the first housing end and suitably shaped, together with the housing interior and the first bundle end, to seal the first housing end and define a first chamber communicating with the membrane lumens;
- g. second end cap means adjacent the second housing end and suitably shaped, together with the housing interior and the second bundle end, to seal the second housing end and define a second chamber;
- h. the housing having at least one port communicating with the first chamber, arranged to permit fluid injection and withdrawal therethrough;

the improvement comprising:
- i. a turbulence promoting web;

in which the hollow fibers in the array are arranged in a single mutually parallel layer facing one side of and at least intermittently bonded across their full lengths to the web, the fibrous web being coextensive with the entire layer of hollow fibers.

4. In a spiral-type hollow fiber membrane-containing module, said module comprising:
- a. a plurality of hollow fiber membranes each having a lumen, said membranes being formed into an array in which the hollow fibers substantially are mutually-parallel;
- b. a hollow mandrel having a longitudinal axis and an exterior surface, an axial bore, and perforations along the surface which communicate with the bore;
- c. the array being wound upon the axis such that the hollow fibers are substantially parallel to the axis, into a spirally-wound membrane bundle having two bundle ends and an exterior surface;
- d. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers respectively constituting the first and second bundle ends being exposed and communicating with the exterior of the bundle;
- e. a housing having two housing ends and a housing interior and being suitably shaped to contain the membrane bundle, having means adjacent the two housing ends sealing both of the two tube sheets to the housing interior, said housing which contains the bundle defining two regions mutually communicating through the membrane including (1) a shell-side space exterior to the portion of the bundle between the tube sheets and within the housing, and (2) a space including the hollow fiber lumens and both of the bundle ends;
- f. two end cap means respectively adjacent the two housing ends and suitably shaped, together with the housing interior and the two adjacent respective bundle ends, to seal each of the two housing ends and define first and second chambers communicating with the membrane lumens;
- g. the housing having at least one port communicating with each of the two chambers, arranged to permit fluid injection and withdrawal therethrough;

the improvement comprising:
- h. a turbulence promoting web;

in which the hollow fibers in the array are arranged in a single mutually parallel layer facing one side of and at least intermittently bonded across their full lengths to the web, the web being coextensive with the entire layer of hollow fibers.

5. In a spiral-type hollow fiber membrane-containing cartridge, said cartridge comprising:
- a. a plurality of hollow fiber membranes each having a lumen, said membranes being formed into an array in which the hollow fibers substantially are mutually-parallel;
- b. the array being wound upon an axis which is substantially parallel to the hollow fibers into a spirally-wound membrane bundle having two bundle ends and an exterior surface;
- c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting at least a first one of the bundle ends being exposed and communicating with the exterior of the bundle;

the improvement comprising:
- d. a turbulence promoting web;

in which the hollow fibers in the array are arranged in a single mutually parallel layer facing one side of and at least intermittently bonded across their full lengths to the web, the web being coextensive with the entire layer of hollow fibers.

6. In a spiral-type hollow fiber membrane-containing cartridge, said cartridge comprising:
   a. a plurality of hollow fiber membranes each having a lumen, said membranes being formed into an array in which the hollow fibers substantially are mutually-parallel;
   b. a hollow mandrel having a longitudinal axis and an exterior surface, an axial bore, and perforations along the surface which communicate with the bore;
   c. the array being wound upon the axis such that the hollow fibers are substantially parallel to the axis, into a spirally-wound membrane bundle having two bundle ends and an exterior surface;
   d. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting at least a first one of the bundle ends being exposed and communicating with the exterior of the bundle;
the improvement comprising:
   e. a turbulence promoting web;
in which the hollow fibers in the array are arranged in a single mutually parallel layer facing one side of and at least intermittently bonded across their full lengths to the web, the web being coextensive with the entire layer of hollow fibers 7. The module of claim 1, 2, 3 or 4 in which the web is a fibrous material having randomly-arranged unbonded fiber ends.

8. The cartridge of claim 5 or 6 in which the web is a fibrous material having randomly-arranged unbonded fiber ends.

9. The module of claim 1, 2, 3 or 4 in which the web is a fibrous spun-bonded material.

10. The cartridge of claim 5 or 6 in which the web is a fibrous spun-bonded material.

11. In a method of fabricating a spiral-type hollow fiber membrane-containing cartridge, comprising the following steps: p1 a. forming a plurality of hollow fiber membranes each having a lumen, into an array in which the hollow fibers substantially are mutually-parallel; then
   b. winding the array upon an axis which is substantially parallel to the hollow fibers into a spirally-wound membrane bundle having two bundle ends and an exterior surface; then
   c. potting each of the two bundle ends in resinous potting material serving to seal the bundle end into an adjacent monolithic tube sheet, a portion of the bundle between the two tube sheets being free from potting material to form a shell-side region; then
   d. exposing the lumen ends of the hollow fibers constituting at least a first one of the bundle ends to communicate with the exterior of the bundle;
the improvement comprising:
   e. subsequent to step (a), providing a turbulence promoting web;
   f. simultaneously with or subsequent to step (e), arranging the hollow fibers of the array in a single mutually parallel layer facing one side of and at least intermittently bonded across their full lengths to the web, the web being coextensive with the entire layer of hollow fibers.

12. In a method of fabricating a spiral-type hollow fiber membrane-containing cartridge, comprising the following steps:
   a. forming a plurality of hollow fiber membranes each having a lumen, into an array in which the hollow fibers substantially are mutually-parallel; then
   b. forming a spirally-wound membrane bundle having two bundle ends and an exterior surface, by winding the array upon a hollow mandrel having a longitudinal axis and an exterior surface, an axial bore, and perforations along the surface which communicate with the bore, such that the axis is substantially parallel to the hollow fibers; then
   c. potting each of the two bundle ends in resinous potting material serving to seal the bundle end into an adjacent monolithic tube sheet, a portion of the bundle between the two tube sheets being free from potting material to form a shell-side region; then
   d. exposing the lumen ends of the hollow fibers constituting at least a first one of the bundle ends to communicate with the exterior of the bundle; then
the improvement comprising:
   e. subsequent to step (a), providing a turbulence promoting web;
   f. simultaneously with or subsequent to step (e), arranging the hollow fibers of the array in a single mutually parallel layer facing one side of and at least intermittently bonded across their full lengths to the web, the web being coextensive with the entire layer of hollow fibers.

13. In a method of fabricating a spiral-type hollow fiber membrane-containing cartridge, comprising the following steps:
   a. forming a plurality of hollow fiber membranes each having a lumen, into an array in which the hollow fibers substantially are mutually-parallel; then
   b. forming a spirally-wound membrane bundle having two bundle ends and an exterior surface, by winding the array upon a hollow mandrel having a longitudinal axis and an exterior surface, an axial bore, and perforations along the surface which communicate with the bore, such that the axis is substantially parallel to the hollow fibers; then
   c. exposing the lumen ends of the hollow fibers constituting at least a first one of the bundle ends to communicate with the exterior of the bundle;
the improvement comprising:
   d. subsequent to step (a), providing a turbulence promoting web;
   e. simultaneously with or subsequent to step (d), arranging the hollow fibers of the array in a single mutually parallel layer facing one side of and at least intermittently bonded across their full lengths to the web, the web being coextensive with the entire layer of hollow fibers;
   f. simultaneously with step (b), forming a tube sheet at each of the two bundle ends from resinous potting material, serving to seal each bundle end into an adjacent monolithic tube sheet, a portion of the bundle between the two tube sheets being free from potting material to form a shell-side region.

* * * * *